United States Patent [19]

Pohl et al.

[11] 4,163,002

[45] Jul. 31, 1979

[54] FILLER-FORTIFIED POLYALKYLENETEREPHTHALATE MOLDING COMPOSITIONS

[75] Inventors: Werner Pohl, Troisdorf-Spich; Ernst Schainberg, Troisdorf; Werner Schmidt, St. Augustin; Günter Tappe, Troisdorf-Sieglar, all of Fed. Rep. of Germany

[73] Assignee: Dynamit Nobel Aktiengesellschaft, Troisdorf, Fed. Rep. of Germany

[21] Appl. No.: 808,413

[22] Filed: Jun. 20, 1977

[30] Foreign Application Priority Data

Jun. 22, 1976 [DE] Fed. Rep. of Germany ....... 2627869

[51] Int. Cl.² .......................... C08J 3/20; C08K 7/14; C08L 67/02
[52] U.S. Cl. ................................. 260/40 R; 528/274; 528/309
[58] Field of Search .................. 260/40 R, 75 R, 75 T

[56] References Cited

U.S. PATENT DOCUMENTS

| | | | |
|---|---|---|---|
| 3,692,744 | 9/1972 | Rich et al. ..................... | 260/75 R X |
| 3,814,725 | 6/1974 | Zimmerman et al. ............. | 260/40 R |
| 4,049,635 | 9/1977 | Cleary ................................. | 260/75 R |

*Primary Examiner*—Sandra M. Person
*Attorney, Agent, or Firm*—Sprung, Felfe, Horn, Lynch & Kramer

[57] ABSTRACT

A process for preparing a filler-fortified polyalkyleneterphthalate molding composition which comprises mixing a filler with a precondensate of poly-(1,4-butylene)-terephthalate and/or poly-(1,3-propylene)-terephthalate, forming the resultant mixture into a shape and thereafter polymerizing the precondensate by solid-phase condensation under solid-phase condensation conditions; a molding composition prepared by such a process comprising poly-(1,4-butylene)-terephthalate and/or poly-(1,3-propylene)-terephthalate in an amount of 20 to 98 weight percent and 2 to 80 weight percent of a fortifying filler, the amounts based upon the combined amount of polyester and fortifying filler; a shaped object prepared from molding such a molding composition and the process for molding such a molding composition into a molded shaped article.

19 Claims, 3 Drawing Figures

LIFE TIME CURVES IN ACCORDANCE WITH DIN 53,4444 FOR MOLDING COMPOSITIONS OF EXAMPLE I (CURVE a) AND COMPARATIVE EXAMPLE I (CURVE b).

LIFE TIME CURVES IN ACCORDANCE WITH DIN 53,444 FOR MOLDING COMPOSITIONS OF EXAMPLE 3 (CURVE a) AND COMPARATIVE EXAMPLE 3 (CURVE b).

FILLER-FORTIFIED POLYALKYLENETEREPHTHALATE MOLDING COMPOSITIONS

BACKGROUND OF THE INVENTION

1. Field of the Invention

This invention relates to a method for preparing polyalkyleneterephthalate molding compositions fortified with a filler, especially a glass fiber filler, which composition can contain other additives such as stabilizers, flameproofing agents, and the like. This invention relates to a process for preparing such molding compositions, the molding compositions themselves, a process for molding such molding compositions into a shaped article and the resultant shaped article. The resultant shaped articles have improved characteristics especially in respect of lifetime performance under certain tests.

2. Discussion of the Prior Art

Of the thermoplastic polyalkyleneterephthalates, poly-(1,4-butylene)-terephthalate, especially, has been gaining increasing importance because its fabricating characteristics are better than those of polyethyleneterephthalate. Poly-(1,4-butylene)-terephthalate, which will be referred to as PTMT hereinafter, is substantially easier to fabricate by a short-cycle injection molding method at low mold temperature to produce articles of stable dimensions.

It is also known that filler-fortified polyalkyleneterephthalates have a higher rigidity, thermal stability of shape and tensile and flexural strengths than unreinforced polyalkyleneterephthalates. If fibrous fillers of sufficient length are used, the tensile and flexural strengths are especially improved. On the other hand, the fillers reduce the elongation at failure and the impact toughness, resulting in greater brittleness.

In the case of PTMT, for example, whose viscosity number amounts to 150 cm$^3$/g, the impact toughness (measured in accordance with DIN 53,453) is reduced from "unbroken" to approximately 35 kJ/m$^2$ and the elongation at failure (measured per DIN 53,455) is reduced from about 200% to about 2% by a content of 30% glass fibers by weight (initial length 6 mm) when the incorporation of the glass fibers is performed in a single-screw extruder with a temperature program of 285–295–275° C. (from infeed point to die).

The tensile and flexural strengths of glass fiber-filled PTMT are high, but they cannot be fully utilized at high static and/or dynamic stresses, because, due to flow processes in the material, the life time is relatively short. Thus, a glass fiber-fortified PTMT produced by the incorporating process described above and having a viscosity number of 127 cm$^3$/g and a glass fiber content of 30% by weight, has a flexural strength per DIN 53,452 of 190 N/mm$^2$; when a test specimen is stressed with a bending force of 175 N/mm$^2$ the life time is 30 seconds.

This life time behavior limits the practical uses of filler-fortified polyalkyleneterephthalate compositions, especially polytetramethyleneterephthalate.

Important properties are improved in glass fiber fortified polyalkyleneterephthalates as the viscosity increases, i.e., with increasing molecular weight. Upon the incorporation of fortifying fillers into polyalkyleneterephthalate, especially PTMT, even in the case of extruder screws having a gentle kneading characteristic, a thermal degradation (reduction of the viscosity number) of the polymer is encountered, which is greater as the viscosity of the polyalkyleneterephthalate), especially PTMT, increases. Due to the reduction of the viscosity number upon the incorporation of the glass fibers, an embrittlement takes place, resulting in considerable limitations in the application of the material.

In German Auslegeschrift No. 20 42 447 it is proposed to prepare filler-fortified polybutyleneterephthalates or polypropyleneterephthalates of a limited viscosity number from 0.2 to 1.2 dl/g (corresponding viscosity number range from about 20 to 160 cm$^3$/g) either by mixing the fortifying fillers with the polyalkyleneterephthalates after the polycondensation has been completed, e.g., by dry mixing or by mixing with the fully condensed polyalkyleneterephthalate in the melt phase, or by adding the fortifying fillers to the monomer before the beginning of the polycondensation reaction.

If the fortifying fillers are added to the polyalkyleneterephthalate) by dry mixing only, the fortifying fillers will not be uniformly distributed in the finished article. If the fortifying fillers are incorporated into the melt, the disadvantages described above (degradation of the polymer) are encountered.

The incorporation of glass fibers by mixing the fortifying filler into a mixture of the PTMT raw materials also leads to difficulties during the esterification and subsequent melt condensation. In private experiments it was found that the trouble-free incorporation of glass fibers, e.g., 30 percent glass fibers by weight, in the reaction vessel was impossible. Difficulties were encountered even during the transesterification. As the condensation progressed, it was observed that the glass fibers were not incorporated by the increasingly viscous melt and migrated to the surface. The degassing of butanediol-1,4 was considerably impeded by the agglomerating glass fibers. Stirring and mixing them in was virtually impossible or was possible only with great difficulty using special apparatus.

It is an object of this invention to provide a filler-fortified molding composition from, especially, poly-(1,4-butylene)-terephthalate which can be fabricated to tougher products of improved life time in comparison to the formerly known, comparable molding compositions.

SUMMARY OF THE INVENTION

Broadly, this invention contemplates a process for preparing a filler-fortified polyalkyleneterephthalate molding composition which comprises mixing a filler with a precondensate of poly-(1,4-butylene)-terephthalate and/or poly-(1,3-propylene)-terephthalate, forming the resultant mixture into a shape and thereafter polymerizing the precondensate by solid-phase condensation under solid-phase condensation conditions.

This invention further contemplates a molding composition comprising poly-(1,4-butylene)-terephthalate and/or poly-(1,3-propylene)-terephthalate in an amount of 20 to 98 weight percent and 2 to 80 weight percent of a fortifying filler, the amounts being based upon the combined amount of poly-(1,4-butylene)-terephthalate and/or poly-(1,3-propylene)-terephthalate and fortifying filler.

In accordance with this invention there is provided new molding compositions which can be formed into ultimate shaped objects.

This invention further comprises an improvement in a process for forming a molded object wherein a polyester molding composition is introduced into a molding machine and subject to molding conditions, the improvement residing in employing as the molding composition a composition comprising 20 to 98 weight percent of poly-(1,4-butylene)-terephthalate and/or poly-(1,3-propylene)-terephthalate of viscosity number of 80 to 250 and 2 to 80 weight percent of a fortifying filler, the amounts being based upon the combined amounts of poly-(1,4-butylene)-terephthalate and/or poly-(1,3-propylene)-terephthalate and fortifying filler.

This invention further contemplates shaped objects made according to such an improved process, which shaped objects contain the same relative ratio of polyester to fortifying filler and comprise the polyester of viscosity number of 80 to 250.

In accordance with this invention, it has been found that the lifetime of polyester molded objects can be substantially improved if, in the preparation of such a molding composition, a precondensate is admixed with the fortifying filler and the resultant mass subjected to condensation. Generally speaking, the process of the present invention is performed by homogeneously combining a precondensate of poly-(1,4-butylene)-terephthalate and/or poly-(1,3-propylene)-terephthalate with a fortifying filler. Preferably, the filler and polyester are combined in the melt. After they are combined, the mass is preferably subjected to a granulation. This can be performed by mixing the molten mass and passing the same through an extruder to form strands of the precondensate-filler composition. The strands themselves can be chopped into granules, especially granules of particle size between 1 and 10 mm lengths and diameters between 1 and 6 mm. Thereafter, the granules are subjected to a solid-phase condensation until the polyesters have achieved the desired higher viscosity number. Generally speaking, the precondensates which are mixed with the fortifying fillers have a molecular weight such that they possess a viscosity number, determined in accordance with DIN 53727 (A mixture of phenol and 0-dichlorbenzene in a ratio of 60:40 was used as the solvent and the concentration of the solution was equivalent to one gram of polyalkyleneterephthalate in 100 ml. of solvent. The temperature was 20° C. of between 40 and 160 cm$^3$/g, preferably between 60 and 110 cm$^3$/g. Following incorporation of the filler, granulation and solid-phase condensation, the viscosity number of the polyester is raised to more than 40 and up to 300 cm$^3$/g. Generally speaking, the final polyester has a viscosity number of 80 to 250. Oftentimes, the viscosity number is more than 40 and up to 300 units higher than the viscosity number of the precondensate. In a particularly desirable embodiment, the solid-phase condensation is performed upon granules which have been subjected to further comminution prior to solid-phase condensation.

BRIEF DESCRIPTION OF THE DRAWINGS

Referring to the drawings herein, FIGS. I–III, inclusive, graphically represent lifetime curves determined in accordance with Deutsche Industrie Norm 53,444 for various molding compositions of the invention.

FIG. I shows the life time curve for the molding composition of Example 1, curve a, versus the same characteristics for the composition of Comparative Example 1 (curve b).

Figure 1:
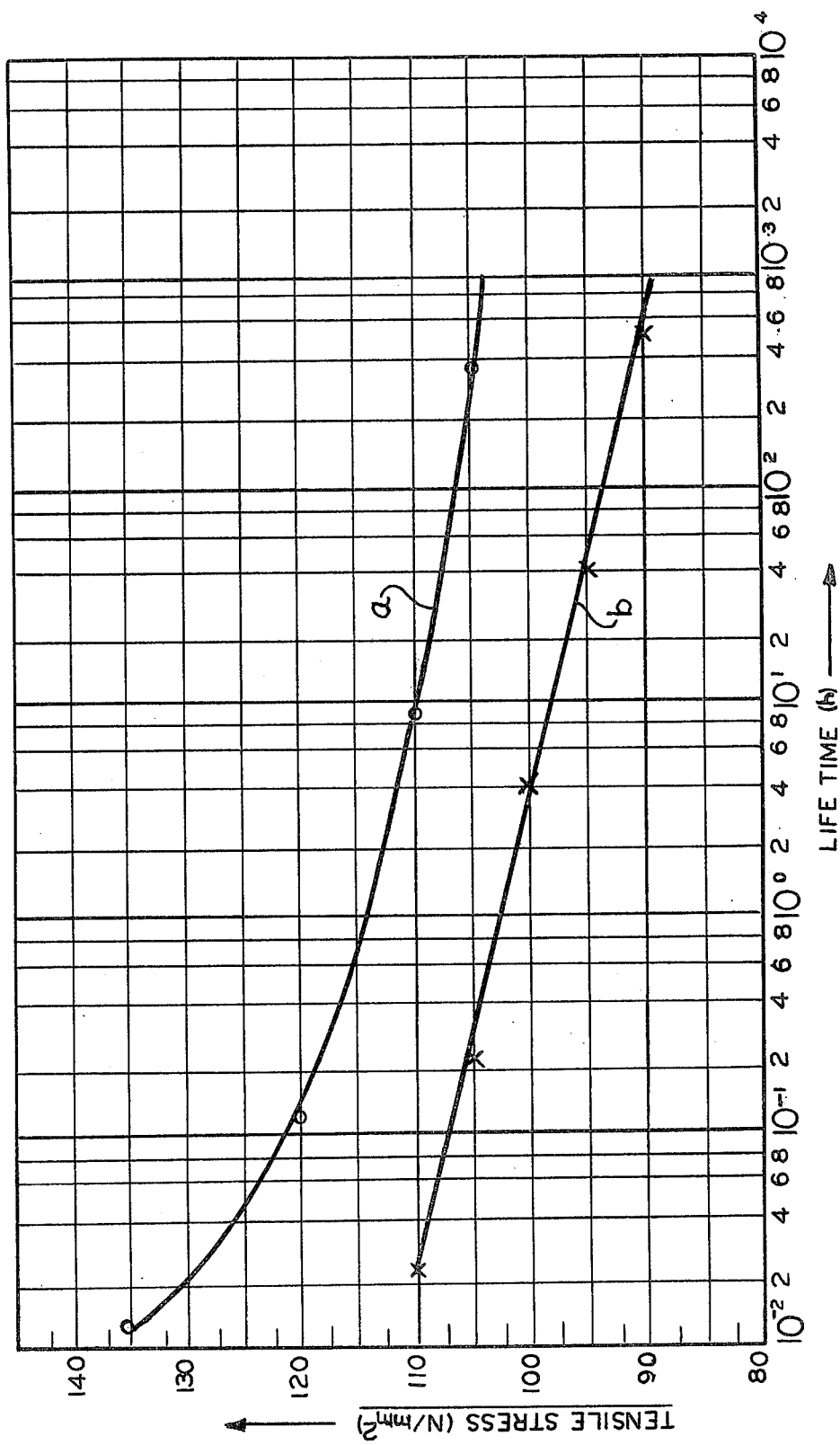
Figure 2:
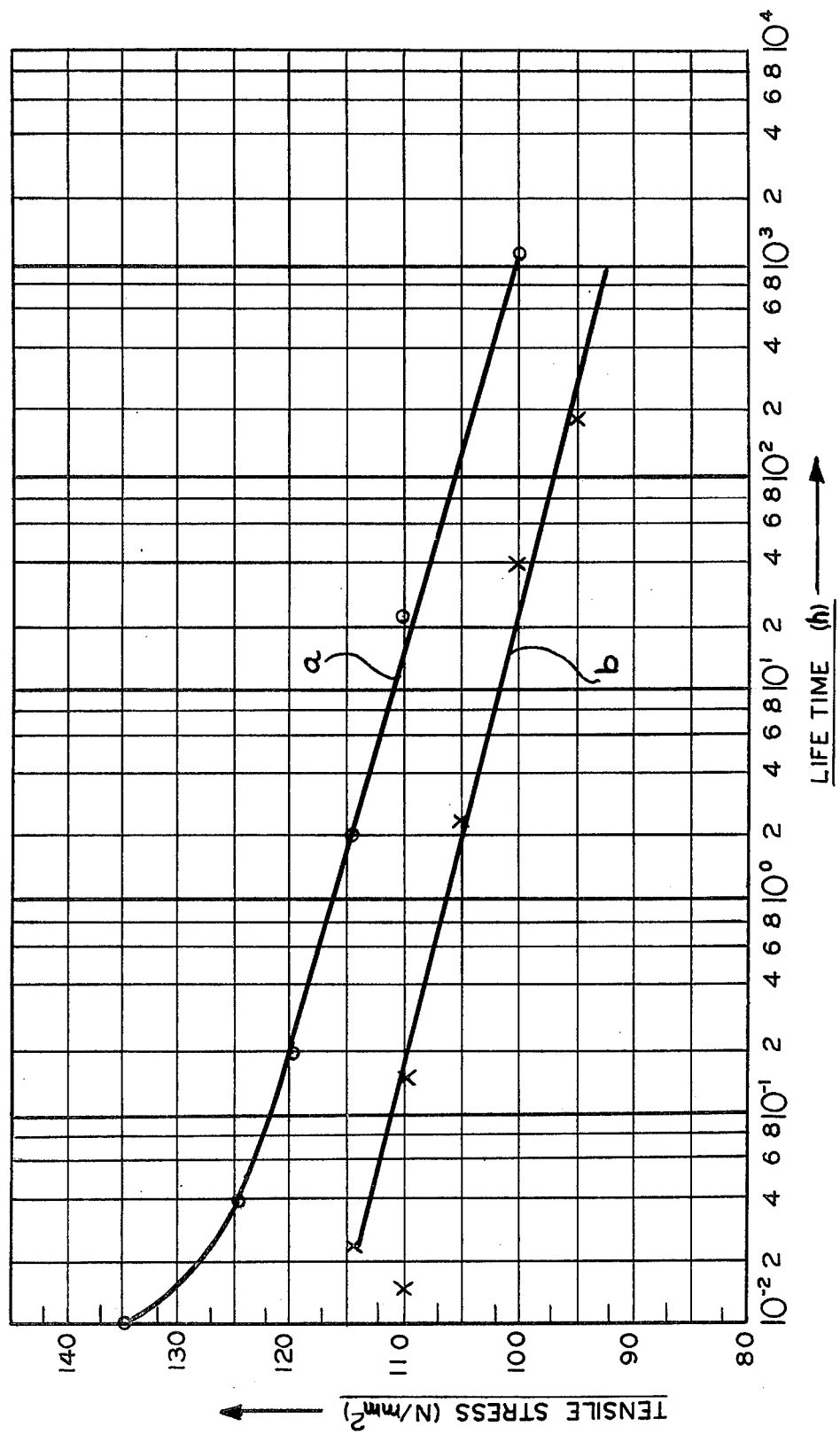
Figure 3:
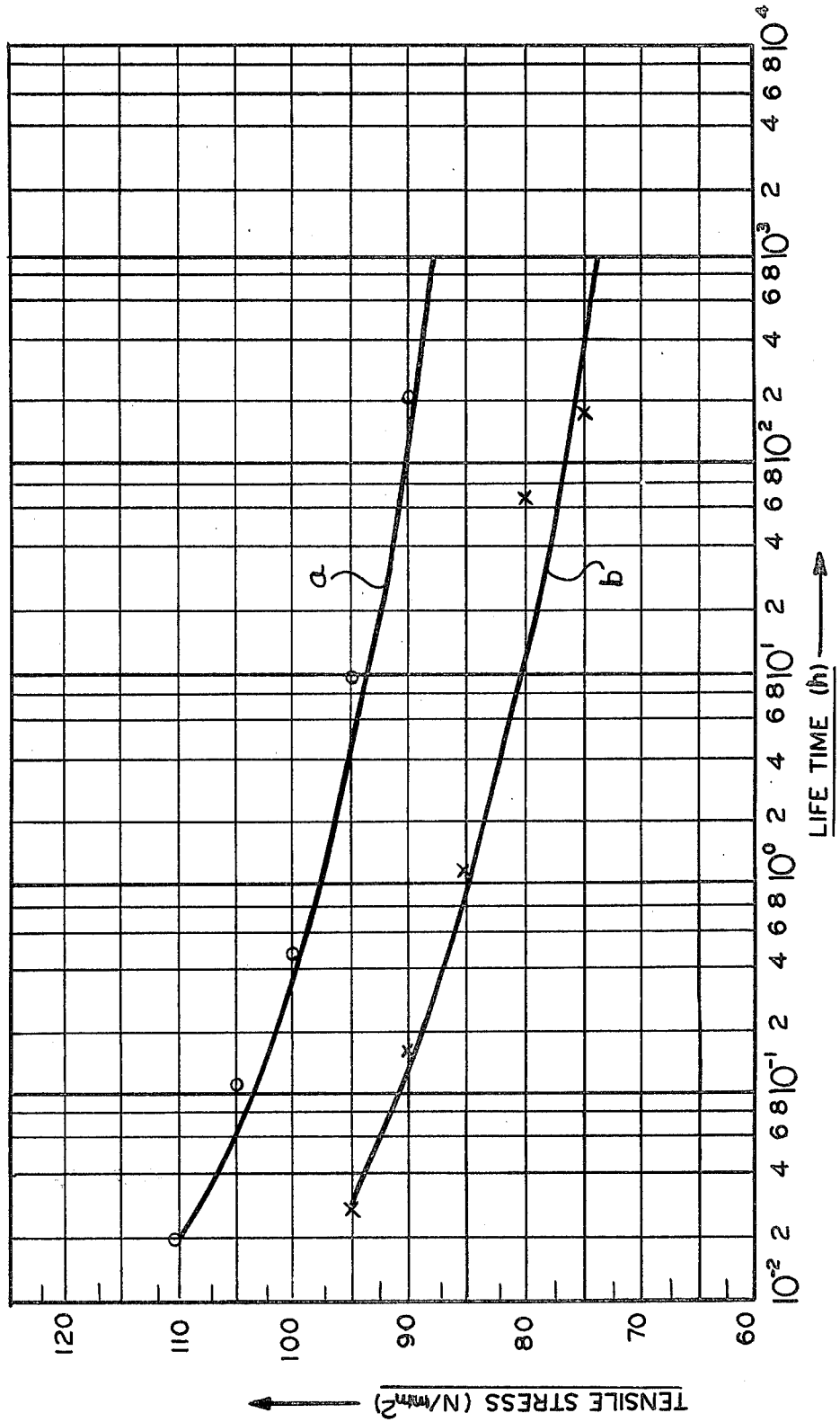

Similarly, FIGS. II and III represent life time curves similarly determined for compositions 2 and 3 of Examples 2 and 3, respectively. Curve a in FIGS. II and III represents the values for the molding composition of the respective Examples, while curve b represents the values for Comparative Examples 2 and 3, as the case may be.

DESCRIPTION OF SPECIFIC EMBODIMENTS

Referring to FIGS. I to III and the Examples herein, it is seen especially from the FIGS. and Table 1 that, in accordance with the present invention, articles are formed from molding compositions of the invention which articles have improved physical properties over articles prepared by prior art techniques. In contrast to articles made from PTMT molding compositions in which the fortifying filler and the other additives are incorporated by means of an extruder in the melt phase after polycondensation is completed, the PTMT molding compositions of the present invention with comparable viscosity numbers have a substantially better life time under the same loading and, additionally, have a higher flexural strength, tensile strength, and impact toughness.

In accordance with the invention, fortifying fillers are added to precondensates in amounts of 2 to 80 percent, preferably 10 to 50 percent by weight, based upon the combined weight of precondensate and fortifying filler. Glass fibers are preferred as fillers, especially glass fibers as described in German Offenlegungsschrift No. 24 26 656, the disclosure of which is herein specifically incorporated by reference. Glass fibers of a length of between 3 and 13 mm, especially about 6 mm are preferentially incorporated in the precondensate mass. Longer or shorter glass fibers can also be used. The length-to-thickness ratio in that case should be greater than 30:1.

Other fillers which produce a strengthening effect can be used in addition to or instead of glass fibers, examples being glass spheres, glass powder, whiskers, asbestos fibers, carbon fibers, synthetic fibers, metal threads, metal chips, metal powders or mixtures thereof, or the like. Those fillers are to be considered as fortifying fillers which increase the modulus of elasticity and/or the tensile and flexural strength.

The incorporation of the fortifying fillers and of other additives if used, is performed preferably after mixing processes which produce a uniform distribution of the added materials in the precondensate. (Methods of incorporating fibrous fillers are described, for example, in "Kunststoff-Rundschau", Vol 7, July 1971, pp. 369–372). Preferably, the precondensate is homogeneously mixed in the melt phase with the fortifying fillers in screw-type or strand extruding units, together with any other additives that are used. If desired, the precondensate, in powder or granulated form, e.g., for powder particle size of 100 to 1000μ, preferably 200 to 500μ or cylinder granulate with lengths between 1 and 10 mm preferably 3 to 6 mm and diameters between 1 to 6 mm preferably 2 to 4 mm, is premixed with the materials to be admixed, and this mixture is homogenized in the melt on suitable machines. Also, the precondensate granules or powder and the additives can be proportioned separately into the inlet or into separate feed openings provided for the purpose in the mixing systems.

In the method of the invention, those precondensate-filler mixtures are subjected to solid-phase condensation in which the polyester components have viscosity numbers determined in accordance with DIN 53727 (A mixture of phenol and o-dichlorobenzene in a ratio of 60:40 was used as the solvent, and concentration of the solution was equivalent to one gram of polyalkyleneterephthalate in 100 ml of solvent. The temperature was 25° C.) of 40 to 160 cm³/g, preferably 60 to 110, and especially 70 to 90 cm³/g, prior to the incorporation of the fortifying fillers and any other additives that may be used. The precondensates must still be sufficiently reactive for the acheivement of the higher final viscosity desired in each case. Those mixtures are preferably used for postcondensation in the solid phase whose polyester component has undergone little or no reduction of their viscosity numbers during the mixing process in the melt phase. Therefore, those precondensates are used preferentially in accordance with the invention which, prior to the incorporation process, have viscosity numbers from 60 to 110 cm³/g, and especially from 70 to 90 cm³/g. After the solid-phase condensation has been completed, for example to viscosity numbers of 150 cm³/g, generally 80 to 250 cm³/g, articles injection molded from these compositions have a substantially better life time than those made in the conventional manner by incorporating the fortifying fillers plus other additives after completion of the polycondensation, when the final viscosity numbers for the polymer in the injection-molded product are comparable. Basically, however, one can subject to solid-phase condensation precondensates which have undergone degradation during the incorporation of the fortifying substances and other additives, but are still sufficiently reactive.

The solid-phase condensation of the filler-fortified precondensate is performed by methods such as those described, for example, in German Offenlegungsschrift No. 2,315,272 for filler-free precondensates, the disclosure of which is incorporated herein by reference. For example, the precondensate emerging from the screw mixer and containing fortifying fillers as well as the additional additives is cut up into granules and, if desired, it is then further comminuted. Granules or particles of maximum uniformity should be used for the solid-phase condensation, so that the latter can take place in a uniform manner. The solid-phase condensation is then performed at elevated temperatures, but below the melting point of the crystalline content of the polymer, preferably about 5° to 60° C. below the melting point of the precondensate, in suitable reactors, e.g., in a tumble dryer, rotary kiln, screw conveyor, a plate dryer, a vibratory dryer, or in a fluid bed or the like. It is desirable to perform the solid-phase condensation in a dry inert gas stream or preferably in a vacuum. If desired, mixtures in the form of endless ribbons or strands containing precondensate can be subjected to the solid-phase condensation instead of granules or powders.

Surprisingly, it has been found that the filler-fortified polyester precondensates require substantially less postcondensation time than filler-free polyester precondensates of the same initial and final viscosities.

The precondensates used in accordance with the invention are prepared in a known manner, preferably by transesterification of a dialkyl or diaryl ester of terephthalic acid (especially dimethyl terephthalate) with butanediol-1,4 or propanediol-1,3, respectively, followed by condensation in the presence of suitable catalysts. If desired, they can be modified with samll amounts, e.g., up to 20 mole-%, of other dicarboxylic acids or diols. For example, aliphatic, cycloaliphatic or aromatic dicarboxylic acids, such as adipic acid, azelaic acid, sebacic acid, dodecanic acid, cyclohexanedicarboxylic acid or isophthalic acid can be used as modifiers. Examples of modifying diols are those having 2 to 10 carbon atoms, such as ethylene glycol, isomers of propylene glycol or butylene glycol, neopentyl glycol, and the like.

For example, dimethyl terephthalate and butanediol-1,4 in a molar ratio of from 1:1.1 to 1:1.5, preferably of 1:1.2 to 1:1.4, and a catalyst such as butyl titanate or tetraoctyleneglycol titanate for example, are transesterified as standard pressure in a kettle in the temperature range from 150° to 180° C., until the rate of distillation of methanol drops off. For the initial condensation, the material is displaced into a second kettle and the excess diol is driven off at a still higher temperature and an appropriate vacuum until the desired degree of condensation is reached. It is desirable to limit the final temperature in the polycondensation to a maximum of 245° to 250° C.

An analogous method is used in the preparation of poly-(1,3-propylene)-terephthalate precondensates and in the preparation of the precondensates of the polyalkylene terephthalates of higher molecular weight which are used in the comparative examples.

The polyesters postcondensed in the solid phase in accordance with the invention generally have higher viscosity numbers than the starting precondensates, of from more than 40 up to 300 cm³/g, preferentially 80 to 250 cm³/g, and especially 130 to 170 cm³/g.

The molding compositions prepared by the method of the invention are used preferentially for the production of injection-molded articles. The preferred polyalkyleneterephthalate is PTMT. Preferred fortifying fillers are glass fibers.

By the method of the invention, injection-molded articles can be made, especially from PTMT, which have a substantially improved life time. In many cases the life time has been improved by a factor of more than 20 under the same flexural or tensile stresses, the impact strength and flexural strength being decidedly improved. In this manner one can replace articles subject to high stress, such as connecting flanges, for example, which heretofore have been made of metal, with glass fiber fortified PTMT.

Additional subject matter of the invention, therefore, is injection-molded objects containing 20 to 98 percent, preferably 50 to 90 percent, by weight, of PTMT of a viscosity number ranging from 80 to 250, preferably from 100 to 160, as well as 2 to 80 percent, preferably 10 to 50 percent, by weight, of a fortifying filler, preferably glass fibers, and additional additives is desired.

In addition to fortifying fillers, the injection-molded objects can contain flameproofing agents as well as other additives, e.g., synergetic agents, pigments, stabilizers, lubricants, plasticizers and the like. Suitable flameproofing agents and other additives are, in general, those which do not vaporize, sublimate, chalk out or otherwise become lost under the conditions of the solid-phase condensation. Preferred flameproofing agents are halogenated, preferably brominated, compounds.

It is desirable to premix the additives with the precondensate, fortifying fillers and flameproofing agents, if any, at room temperature prior to the actual homogenization, preferably in the melt phase, e.g., in a strand extruding unit.

In order to more fully illustrate the nature of the invention and the manner of practicing the same, the following examples are presented:

EXAMPLES

In the following examples, the viscosity numbers are measured in accordance with DIN Standard 53 727. A mixture of phenol and o-dichlorbenzene in a ratio of 60:40 was used as the solvent, and the concentration of the solution was equivalent to one gram of polyalkyleneterephthalate in 100 ml of solvent. The temperature was 25° C.

The rest of the values were measured in accordance with the following standards:

| | |
|---|---|
| Density | DIN 53,479 |
| Modulus of elasticity | DIN 53,457 |
| Tensile strength | DIN 53,455 |
| Flexural strength | DIN 53,452 |
| Impact strength | DIN 53,453 |
| Tensile life time | DIN 53,444 |
| Flexural life time | analogous to: DIN 53,452 and 53,444 |

The incorporation of the glass fibers and of the other additives used was performed in a single screw extruder made by Reifenhauser, Model R-30, screw length 15 times the diameter, diameter 30 mm, compression ratio 1:22.2.

The solid-phase condensation was performed as described for unfortified PBT in German Offenlegungsschrift No. 2,315,272. The temperature amounted to 210° to 213° C., and the vacuum was 1 Torr.

For the production of the injection-molded DIN test specimen, an Eckert & Ziegler Monomat 150S screw-and-piston injection molding machine was used. The composition temperature was approximately 250° to 260° C., and the die temperature was approximately 50° to 60° C.

EXAMPLE 1

5.6 kg of polytetramethyleneterephthalate with a viscosity number of 90 cm$^3$/g was premixed in a tumble mixer with 2.4 kg of chopped glass fibers of a 6-mm length. The polymer-glass fiber premix was formed into a strand by means of a single-screw extruder with a temperature program of 270°–280°–280°–260° C. (from inlet to die), using a die with a 4 mm hole, and was cut by means of a knife granulator to form cylindrical granules of a length of about 3 mm and a diameter of about 3 mm.

After the incorporation of the filler by the extruder the mixture had undergone no measurable thermal degradation. This polytetramethyleneterephthalate and glass fiber mixture was postcondensed in the solid phase in the tumble dryer at a temperature of 210°–213° C. and a vacuum of 1 Torr to a viscosity number of 149 cm$^3$/g in the polymer, over a period of 8 hours. The molding composition was injection molded to form standard test specimens, and the characteristics given in Table 1 were determined.

COMPARATIVE EXAMPLE 1

For comparison, polytetramethyleneterephthalate with a viscosity number of 175 cm$^3$/g was provided in the same manner with 30 parts by weight of chopped glass fibers of a length of 6 mm. The temperatures in the extruder for the incorporation of the fibers had to be increased by an average of 10° to 15° C. above those of Example 1 for this mixture. After the glass fiber incorporation and the strand producing process, the granulation was performed as described above. The viscosity number of the polymer after the incorporation amounted to 149 cm$^3$/g. The granules were injection-molded to form standard test specimens as in Example 1. The characteristics are listed in Table 1.

EXAMPLE 2

In the manner described in Example 1, a mixture of PTMT and glass fibers was prepared, the initial viscosity number of the polymer amounting to 90 cm$^3$/g. The solid-phase condensation was performed until the PTMT had reached a viscosity number of 123 cm$^3$/g. The postcondensation conditions were the same as in Example 1, except that the time could be shortened to 5 hours. The characteristics of the injection-molded standard test specimens are given in Table 1.

COMPARATIVE EXAMPLE 2

For comparison, a PTMT-glass fiber mixture was prepared as in Comparative Example 1, with a polymer viscosity of 127 cm$^3$/g. The initial viscosity number of the PTMT was 150 cm$^3$/g. The polymer was degraded by the mixing operation to 127 cm$^3$/g. The mixture was injection-molded to standard test specimens. The characteristics as measured are given in Table 1.

EXAMPLE 3

5.6 kg of PTMT with a viscosity number of 90 cm$^3$/g was homogenized with 1.6 kg of chopped glass fibers of 6 mm length and 0.8 kg of glass spheres of an average diameter of 50 microns, in the manner described in Example 1, and after granulation the composition was postcondensed in the solid phase as described in Example 1 to a polymer viscosity of 150 cm$^3$/g. The characteristics of the injection-molded bodies are listed in Table 1.

COMPARATIVE EXAMPLE 3

For comparison, 5.6 kg of PTMT with a viscosity number of 175 cm$^3$/g was mixed in the same manner with 1.6 kg of chopped glass fibers 6 mm long and 0.8 kg of glass spheres of a diameter of 50 microns. The viscosity number of the polymer after incorporation of the fortifying materials was 154 cm$^3$/g. The mixture was injection molded to form standard test specimens. The characteristics are given in Table 1.

Table 1

| Characteristics of the Molding Compositions Described in the Examples | | | | | | | |
|---|---|---|---|---|---|---|---|
| Molding composition of | | Example 1 | Compar. Example 1 | Example 2 | Compar. Example 2 | Example 3 | Compar. Example 3 |
| Glass fiber content | wt. % | 30 | 30 | 30 | 20 | 20 | — |
| Glass sphere content | wt. % | — | — | — | — | 10 | 10 |
| Viscosity No. | cm$^3$/g | | | | | | |
| (a) Granules | | 149 | 149 | 123 | 127 | 150 | 154 |
| (b) Shaped bodies | | 142 | 145 | 117 | 122 | 145 | 148 |

Table 1-continued

Characteristics of the Molding Compositions Described in the Examples

| Molding composition of | | Example 1 | Compar. Example 1 | Example 2 | Compar. Example 2 | Example 3 | Compar. Example 3 |
|---|---|---|---|---|---|---|---|
| Density* | g/cm$^3$ | 1.53 | 1.527 | 1.526 | 1.529 | 1.524 | 1.525 |
| Flexural strength | N/mm$^2$ | 210 | 190 | 210 | 190 | 175 | 160 |
| Tensile strength | N/mm$^2$ | 145 | 135 | 250 | 135 | 120 | 110 |
| Modulus of elasticity (tension test) | N/mm$^2$ | 10,000 | 10,000 | 10,200 | 10,000 | 6700 | 6800 |
| Impact strength | | | | | | | |
| at 23° C. | kJ/m$^2$ | 48 | 38 | 46 | 38 | 38 | 34 |
| at −40° C. | kJ/m$^2$ | 47 | 35 | 44 | 36 | 36 | 32 |
| Life time in seconds at flexural stress of | | | | | | | |
| 175 N/mm$^2$ | | 600 | 50 | 600 | 30 | — | — |
| 150 N/mm$^2$ | N/mm$^2$ | | | | | 600 | 80 |
| Tensile life time test - See Fig. | | I | I | II | II | III | III |

*Measured on the injection-molded specimen.

What is claimed is:

1. A process for preparing a filler-fortified polyalkyleneterephthalate molding composition which comprises mixing a filler with a precondensate having a viscosity number of from 40 to 160 cm$^3$/g of poly-(1,4-butylene)-terephthalate and/or poly-(1,3-propylene)-terephthalate, forming the resultant mixture into a shape and thereafter polymerizing the precondensate by solid-phase condensation under solid-phase condensation conditions.

2. A process according to claim 1 wherein 2 to 80 weight percent filler is mixed with precondensate.

3. A process according to claim 1 wherein 10 to 50 weight percent is mixed with precondensate.

4. A process according to claim 1 wherein said filler is a glass fiber.

5. A process according to claim 1 wherein into said mixture of filler and precondensate there is added another additive.

6. A process according to claim 1 wherein the precondensate and filler are mixed in the melt.

7. A process according to claim 1 wherein mixing of said precondensate and filler is performed in a screw mixing or strand pressing unit.

8. A process according to claim 1 wherein after the precondensate - filler mixture is formed into a shape it is granulated.

9. A process according to claim 1 wherein said precondensate has a viscosity number of from 60 to 110 cm$^3$/g.

10. A process according to claim 1 wherein said precondensate has a viscosity number of from 70 to 90 cm$^3$/g.

11. A process according to claim 1 wherein the solid-phase condensation is carried out until the post-condensate has a viscosity number of more than 40 and up to 300 units higher than the precondensate.

12. A process according to claim 1 wherein the solid-phase condensation is carried out until the post-condensate has a viscosity number of more than 80 and up to 250 units higher than the precondensate.

13. A process according to claim 1 wherein the solid-phase condensation is carried out until the post-condensate has a viscosity number of more than 130 and up to 170 units higher than the precondensate.

14. A process according to claim 1 wherein the solid-phase condensation is performed at elevated temperatures but below the melting point of any crystalline content of the precondensate in an inert gas stream or in a vacuum.

15. A process according to claim 14 wherein the solid-phase condensation is effected at a temperature of 5° to 60° C. below the melting point of any crystalline content of the precondensate.

16. A process according to claim 1 wherein the filler is mixed with the precondensate while the precondensate is in the molten state.

17. In a process for forming a molded object wherein a polyester molding composition is introduced into a molding machine and subjected to molding conditions, the improvement which comprises employing as the molding composition the composition comprising 20 to 98 weight percent of poly-(1,4-butylene)-terephthalate and/or poly-(1,3-propylene)terephthalate of viscosity number of 80 to 250 and 2 to 80 weight percent of a fortifying filler, based on the combined amount of poly-(1,4-butylene)-terephthalate and/or poly-(1,3-propylene)-terephthalate and fortifying filler, said composition prepared by the process of claim 1.

18. A process according to claim 17 wherein the process is an injection molding process.

19. A filler-fortified polyalkyleneterephthalate molding composition whenever prepared according to claim 1.

* * * * *

UNITED STATES PATENT AND TRADEMARK OFFICE
CERTIFICATE OF CORRECTION

PATENT NO. : 4,163,002
DATED : July 31, 1979
INVENTOR(S) : POHL et al.

It is certified that error appears in the above-identified patent and that said Letters Patent are hereby corrected as shown below:

Column 3, line 43, "20°" should read -- 25° --.
Column 5, line 7, "acheivement" should read -- achievement --.
Column 5, line 63, "samll" should read -- small --.
Column 6, line 9, "as" should read -- at --.
Column 7, line 25, "1:22.2" should read -- 1:2.2 --.

Signed and Sealed this

Eighteenth Day of December 1979

[SEAL]

Attest:

Attesting Officer

SIDNEY A. DIAMOND

Commissioner of Patents and Trademarks